US012562359B2

(12) United States Patent
Bloomfield et al.

(10) Patent No.: US 12,562,359 B2
(45) Date of Patent: Feb. 24, 2026

(54) SYSTEMS AND METHODS FOR CHARGE STATE ASSIGNMENT IN MASS SPECTROMETRY

(71) Applicant: DH TECHNOLOGIES DEVELOPMENT PTE. LTD., Singapore (SG)

(72) Inventors: Nic Bloomfield, Newmarket (CA); Gordana Ivosev, Etobicoke (CA); Pavel Ryumin, Toronto (CA)

(73) Assignee: DH Technologies Development Pte. Ltd., Singapore (SG)

(*) Notice: Subject to any disclaimer, the term of this patent is extended or adjusted under 35 U.S.C. 154(b) by 421 days.

(21) Appl. No.: 18/040,779

(22) PCT Filed: Aug. 6, 2021

(86) PCT No.: PCT/IB2021/000514
§ 371 (c)(1),
(2) Date: Feb. 6, 2023

(87) PCT Pub. No.: WO2022/029485
PCT Pub. Date: Feb. 10, 2022

(65) Prior Publication Data

US 2023/0298876 A1 Sep. 21, 2023

Related U.S. Application Data

(60) Provisional application No. 63/062,231, filed on Aug. 6, 2020.

(51) Int. Cl.
*H01J 49/00* (2006.01)
*H01J 49/02* (2006.01)

(52) U.S. Cl.
CPC ........ *H01J 49/0036* (2013.01); *H01J 49/025* (2013.01)

(58) Field of Classification Search
CPC ... H01J 49/025; H01J 49/0031; H01J 49/0036
See application file for complete search history.

(56) References Cited

U.S. PATENT DOCUMENTS 9,159,538 B1 * 10/2015 McClure ............ H01J 49/0045
2018/0005809 A1 1/2018 Roukes
(Continued)

FOREIGN PATENT DOCUMENTS

DE 102010006450 A1 * 8/2011 ............ G16B 50/00
GB 2524357 9/2015
(Continued)

OTHER PUBLICATIONS

Wehofsky and Hoffmann, "Automated Deconvolution and Deisotoping of Electrospray Mass Spectra", Journal of Mass Spectrometry , 2002; 37; 223-229, 2001 (Year: 2001).*
(Continued)

*Primary Examiner* — David E Smith
(74) *Attorney, Agent, or Firm* — Merchant & Gould P.C.

(57) ABSTRACT

Devices and methods are described for assigning charge state to detected ions from a mass analysis instrument. In one of the methods, the charge state may be assigned, for instance, by evaluation a detector response signal including information related to individual ion responses generated by an ion detector for each ion arrival event captured by the detector. The detector response signal may then be evaluated in combination with one or more additional features corresponding to the ion arrival event to assign a charge state for that ion arrival event.

10 Claims, 10 Drawing Sheets

An example of grouping m/z bins according to detector response profile using principal component variable grouping (PCVG) algorithm

(56) References Cited

U.S. PATENT DOCUMENTS

| | | | | |
|---|---|---|---|---|
| 2018/0301326 | A1* | 10/2018 | Bern | G06N 3/126 |
| 2018/0340827 | A1 | 11/2018 | Yamada | |
| 2023/0282469 | A1 | 9/2023 | Bloomfield | |
| 2023/0335384 | A1 | 10/2023 | Ryumin | |

FOREIGN PATENT DOCUMENTS

| | | | | |
|---|---|---|---|---|
| GB | 2524357 | A * | 9/2015 | H01J 49/0031 |
| WO | WO-2015191993 | A1 * | 12/2015 | H01J 49/0036 |
| WO | 2019/142068 | | 7/2019 | |
| WO | 2019/197983 | | 10/2019 | |
| WO | 2020/109091 | | 6/2020 | |
| WO | 2020/157720 | | 8/2020 | |

OTHER PUBLICATIONS

Wehofsky and Hoffmann, "Automated Deconvolution and Deiosotoping of Electrospray Mass Spectra", Journal of Mass Spectrometry, 2002; 37; 223-229, 2001 (Year: 2001).*

Contino, Nathan C. et al., "Charge Detection Mass Spectometry with Resolved Charge States", Journal of the American Society for Mass Spectometry, vol. 24, No. 1, Nov. 30, 2012, pp. 101-108.

Kafader, Jared O. et al., "Multiplexed Mass Spectometry of Individual Ions Improves Measurement of Proteoforms and Their Complexes", Nature Methods, Nature Pub. Group, NY, vol. 17, No. 4, Mar. 2, 2020, pp. 391-394.

Kolakowski, Beata et al., "Review of applications of high-field asymmetric waveform ion mobility spectrometry (FAIMS) and differential mobility spectrometry (DMS)", The Analyst, vol. 132, No. 9, Jun. 26, 2007, pp. 842-864.

Hofstadler, Steven A. et al., "Selective Ion Filtering by Digital Thresholding: A Method to Unwind Complex ESI-Mass Spectra and Eliminate Signals from Low Molecular Weight Chemical Noise", Analytical Chemistry, vol. 78, No. 2, Jan. 1, 2006, pp. 372-378.

Kafader et al., "Measurement of Individual Ions Sharply Increases the Resolution of Orbitrap Mass Spectra of Proteins", Analytical Chemistry 2019, 91, 4, pp. 2776-2783.

Kafader et al., "STORI Plots Enable Accurate Tracking of Individual Ion Signals", J Am Soc Mass Spectrom. 2019, 11, pp. 2200-2203.

Marty, Michael, et al., "Bayesian Deconvolution of Mass and Ion Mobility Spectra: From Binary Interactions to Polydisperse Ensembles", Anal. Chem. 2015, 87, 8, 4370-4376.

PCT International Preliminary Report on Patentability in International Application PCT/IB2021/000551, mailed Feb. 16, 2023, 11 pages.

PCT International Preliminary Reporton Patentability in International Application PCT/IB2021/000514, mailed Feb. 16, 2023, 8 pages.

PCT International Search Report and Written Opinion in International Application PCT/IB2021/000514, mailed Nov. 26, 2021, 11 pages.

PCT International Search Report and Written Opinion in International Application PCT/IB2021/000551, mailed Dec. 23, 2021, 14 pages.

Pierson, Elizabeth et al., "Charge Detection Mass Spectomoetry for Single Ions with an Uceratinty in the Charge Measurement of 0.65 e", Journal of the American Society for Mass Spectometry, Elsevier Science, vol. 26, No. 7, Apr. 14, 2015, pp. 1213-1220.

Wehofsky, M. et al., "Automated deconvolution and deistoping of electrospray mass spectra", Journal of Mass Spectometry, vol. 37, Jan. 1, 2002, pp. 223-229.

* cited by examiner

An example of overlapping features in top-down spectra, challenging for conventional deconvolution algorithms Figure 2. Exemplary pulse height distributions of 7+ charged ion (red) at m/z 517 and 3+ ion (blue) at m/z 517

Figure 3. An example of grouping m/z bins according to detector response profile using principal component variable grouping (PCVG) algorithm Figure 4: Detector response distribution of 829.5(1+) ion acquired under low ion rate (0.2 ions per push on average) and high ion rate (6 ions per push on average) conditions Figure 5. Heatmap representation of detector response profile and m/z position Figure 6. An exemplary workflow for charge state assignment using detector response profiles Figure 7. An exemplary workflow for charge state assignment using detector response profiles Figure 8. An exemplary workflow for charge state assignment using detector response profiles Figure 9. An exemplary workflow for charge state assignment using detector response profiles

SYSTEMS AND METHODS FOR CHARGE STATE ASSIGNMENT IN MASS SPECTROMETRY

CROSS-REFERENCE TO RELATED CASES

This application is a National Stage Application of PCT International Patent Application No. PCT/IB2021/000514, filed Aug. 6, 2021, which claims the benefit of priority to U.S. Patent Application Ser. No. 63/062,231, filed Aug. 6, 2020 the contents of which are incorporated herein by reference in their entireties. To the extent appropriate, a claim of priority is made to each of the above disclosed applications.

BACKGROUND

Discriminating between mass signals generated for ions having similar mass-to-charge (m/z) can be a difficult problem in mass spectrometry.

In top-down mass spectrometry (MS) protein analysis, for example, overlapping of mass or mass-to-charge (m/z) peaks in a mass spectrum is a significant problem. In this type of analysis, a wide range of different fragment or product ions are produced, including product ions that have lengths of 1-200 amino acids and have 1-50 different charge states. The product ion peaks are heavily overlapped with each other in a single spectrum. In addition, the overlap can be so extensive that even mass spectrometers with the highest mass resolution (Fourier transform ion cyclotron resonance (FT-ICR) or Orbitrap) cannot deconvolve such overlapped peaks. As a result, large product ions are often lost in top-down protein analysis, limiting the sequence coverage of large proteins.

For compound identification, mass spectra are usually converted into a list of monoisotopic masses corresponding to different compounds. To find such masses the following strategy is often employed: first, each peak in the mass spectrum is assigned to a corresponding isotopic cluster and the charge state of such cluster is found. Following this, the lowest m/z peak is found for each cluster, which is the peak corresponding to the monoisotopic mass. Knowing the cluster charges the monoisotopic peaks of each cluster can be converted to a zero-charge list of monoisotopic masses, which then can be used in subsequent algorithms attributing mass spectral peaks to chemical compounds. Practically, correct charge state assignment to a feature (isotopic cluster) in the mass spectrum is a key step towards compound identification.

Conventionally, charge deconvolution algorithms in the m/z domain are used for charge state identification. However if there is a severe spectral overlap, which includes interdigitated peaks and peak overlapping, this approach is challenging. This is often the case for complex spectra of mixtures or product ion spectra of large biopolymers, such as top-down analysis spectra. FIG. 1 is a plot illustrating an example of multiple overlapping features in an ECD top-down spectrum of CA2, where conventional algorithms are prone to errors.

It has long been recognized that the detection response for both electron-multiplier or image-charge detection systems can be proportional to the charge state of the measured ion (e.g. see references listed in PCT/IB2020/050795, incorporated herein by reference). Therefore, in theory the charge state can be determined upon careful investigation of such intensities. Interestingly, few attempts have been made to exploit the phenomena for charge state inference. This is because it is challenging technologically.

First, detection events from multiple acquisitions are conventionally summed into a single spectrum to compress the data. Such compression however prevents any further analysis of detector responses of each individual ion events rendering it impossible to infer the charge state. A complete record of each ion detection event intensity and it's mass spectral feature, e.g. time of flight or oscillation frequency, is therefore preferred for such analysis. Alternative data compression strategies can also be utilized for retaining some information of individual detector responses while still maintaining data compression. For example, each detection event can be co-added to a multiple spectra forming detector response bands similar to the approach described in PCT/IB2020/050795, incorporated by reference in its entirety.

Second, multiple co-detected ions can generate a detector response, which is substantially a sum of the detector responses generated by each co-arriving ion. It is therefore not always possible to infer the charge state of the ions using only the detector response intensity of the detected signal. In general, sufficiently low ion flux is preferred for charge state determination using detector response, such that of the number of detection events with co-arriving ions is minimized.

Third, another challenge in such methods is that the detector response distributions for each particular type of ion are wide and often overlap for different species. FIG. 2 is a plot illustrating an example of detector response distributions when detecting an ion with 3+ charge as compared to an ion with 7+ charge. As illustrated the detector response is different for ions with 3+ charge as compared to ions with 7+ charge. As a result, the pulse height distributions as observed by the detector for ions of a same m/z, m/z 517 in this example, are wide and overlapping. Such wide pulse height distributions make any conventional charge state assignment approaches based on the detector responses intensities inferior due to the difficulty in discriminating between ions of a same m/z but different charge.

The problem of wide intensity distributions for direct identification of charge state using detection response intensity was recognized and a few strategies were proposed to deal with it for mass spectrometers employing image-charge based detectors. In such systems, the wide distribution predominantly can be attributed to the collisions with the residual neutral molecules during the measurement, which quench the coherent oscillation of the ion of interest and effectively stop the detection of its signal making its contribution dependent on the actual ion measurement time. Therefore, it was proposed to filter the detection events attributed to the ions experienced the collision during the acquisition (Kafader et. al. *Anal. Chem.* 2019, 91, 4, 2776-2783). This approach, however, leads to a large number of ions being discarded, thus sufficiently increasing the time to obtain good ion statistics. In addition approaches to reduce base pressure and decrease ion velocity also proposed, however those adversely affect mass analyzer characteristics. Finally, it was proposed to employ sophisticated data processing techniques to detect exact time of the collision and hence scale the measured signal intensity according to the actual detection time (Kafader et. al. J. Am. Soc. Mass. Spectrom. 2019, 11, 2200-2203).

For mass spectrometers that use an electron-multiplier detector, the average number of secondary emission electrons is well defined for each ion with a particular m/z and charge, but the exact number of emitted primary electrons defining the magnitude of the observed response is a probabilistic quantity. Both secondary emission yield and collisions with the bath gas are described by Poisson statistics, but the underlying physics of the process is very different. Therefore, none of the techniques proposed to deal with the wide distributions for mass spectrometers employing image-charge induced detectors are applicable for the mass spectrometers with electron-multiplier based detection systems.

Therefore, there is a need for methods, which address the problem.

SUMMARY

In some embodiments, a method is provided for assigning charge state. In some aspects, the method may include assigning a molecular weight based on the assigned charge state.

In some embodiments, the method may include capturing from a detector a detector response signal corresponding to a plurality of ion arrival events. The detector response signal comprising information related to individual ion responses generated by the detector for each ion arrival event. The method may further comprise combining the detector response signal with one or more additional features corresponding to the ion arrival event to assign a charge state for that ion arrival event. In some aspects the one or more additional features may be selected from a group including: m/z; ion mobility; DMS parameter, chromatographic time. In some embodiments the method may further comprise calculating a mass corresponding to the ion arrival events based on the assigned charge states and the m/z corresponding to those ion arrival events.

In some embodiments, the combining the detector response signal with one or more additional features may comprise: grouping m/z bins based on one or more of the features and producing a simplified mass spectrum from the combination of the detector response signal and the one or more features.

In some aspects, the one or more features comprises the recorded detector response.

In some aspects, the grouping comprises applying principle components analysis (PCA) to the detector response signal.

In some aspects, the grouping comprises: generating a list of elementary detector response profiles and corresponding m/z bins, identifying detector response profiles attributed to unique compounds, and decomposing one or more remaining detector response profiles and corresponding m/z bins based on the identified detector response profiles attributed to the unique compounds.

In some aspects, the grouping comprises: generating a list of unique detector response profiles, finding elementary detector response profiles attributed to elementary features, and attributing remaining mixed groups to said elementary features.

In some aspects, the grouping comprises: generating a list of unique detector response profiles, identifying elementary detector response profiles attributed to said elementary features, and attributing the remaining mixed groups to said elementary features.

In some aspects, the grouping may further comprise updating the generated list based on contributions of said corresponding elementary detector response profiles.

In some aspects, the grouping comprises applying a grouping algorithm, and wherein the method further comprises: identifying unique groups; identifying ion groups from the unique groups based on elementary features; and, attributing remaining mixed groups to said elementary features.

In some embodiments, a device is provided for assigning charge states. The device may include: at least one processing element; and non-transitory memory storing program code that, when executed by the at least one processing element, causes the device to: capture a detector response signal corresponding to a plurality of ion arrival events, the detector response signal comprising information related to individual ion responses generated by the detector for each ion arrival event; and, combine the detector response signal with one or more additional features corresponding to the ion arrival event to assign a charge state for that ion arrival event.

In some aspects, the device may be further operative to: calculate a mass corresponding to the ion arrival events based on the assigned charge states and the m/z corresponding to those ion arrival events. The one or more additional features may be selected, for instance, from a group including: m/z; ion mobility; DMS parameter; and, chromatographic time.

In some aspects, the device may be further operative to: further operative to: calculate a mass corresponding to the ion arrival events based on the assigned charge states and the m/z corresponding to those ion arrival events.

The one or more additional features may include, for instance, m/z domain information.

In some embodiments, a device may be provided for assigning charge states. The device may include, for instance: at least one processing element; non-transitory memory storing program code that, when executed by the at least one processing element, causes the device to: generate, from mass analysis data, a plurality of detector response profiles, each detector response profile comprising an m/z range containing a portion of a mass spectrum extracted from the mass analysis data; evaluate the plurality of detector response profiles to group similar detector response profiles; reduce each group of similar detector response profiles to a simplified mass spectrum representative of that group; and, associate each simplified mass spectrum with a corresponding compound and related charge state.

The device may be operative to associate one or more additional separation domains with the detector response profiles. The additional separation domains may, for instance, be selected from the group including: retention time, drift time, and DMS operational parameters)

In some embodiments, a device is provided for assigning charge states. The device may include, for instance: at least one processing element; non-transitory memory storing program code that, when executed by the at least one processing element, causes the device to: generate, from mass analysis data, a plurality of detector response profiles, each detector response profile comprising an m/z range containing a portion of a mass spectrum extracted from the mass analysis data; and, compare the detector response profiles with a previously generated library of detector response profiles to identify at least one of an associated compound and related charge state.

In some aspects, the previously generated library of detector response profiles comprises a plurality of simplified mass spectra.

DETAILED DESCRIPTION

Although, the detector response profile is insufficient for accurate determination of the charge state it could be very helpful for separating signals originating from different compounds. This, in combination with the fact that the accurate charge state information is encoded in the m/z domain allows for substantially improved performance if conventional charge determination algorithms are coupled with the detector response domain for charge state determination.

Importantly, because separation happens at the last step of the mass spectrometry analysis this method can be applicable in some cases, where alternative approaches will not work. Specifically, LC methods can provide separation of compounds; however, they are of little use for separation of the product ions originating from the same precursor, while the fragments from the same precursor can still substantially overlap. Similarly, ion mobility separation, which is conventionally performed before fragmentation (e.g. differential mobility separation (DMS)) require significant modifications to setup post fragmentation separation.

One approach to enhance performance of the conventional charge determination algorithms is to leverage the detector response profiles for grouping the data. Often the same chemical compound has multiple isotopes forming an isotope cluster, which may or may not be resolved in the m/z domain. The m/z bins corresponding to the positions of those isotopes under certain circumstances will have similar detection response profiles. For example, the detector response profiles will be similar if at least two conditions are satisfied. First, the signal does not overlap (i.e. m/z bin does not contain signal from multiple different species); second, for all m/z bins, which contain the signal from those isotopes, the signal is acquired under predominantly single ion arrival conditions. This allows grouping of m/z bins containing information from the same compound effectively splitting the signal between multiple channels. This yields substantially simplified spectra for subsequent charge detection analysis by conventional algorithms.

Figure 1:
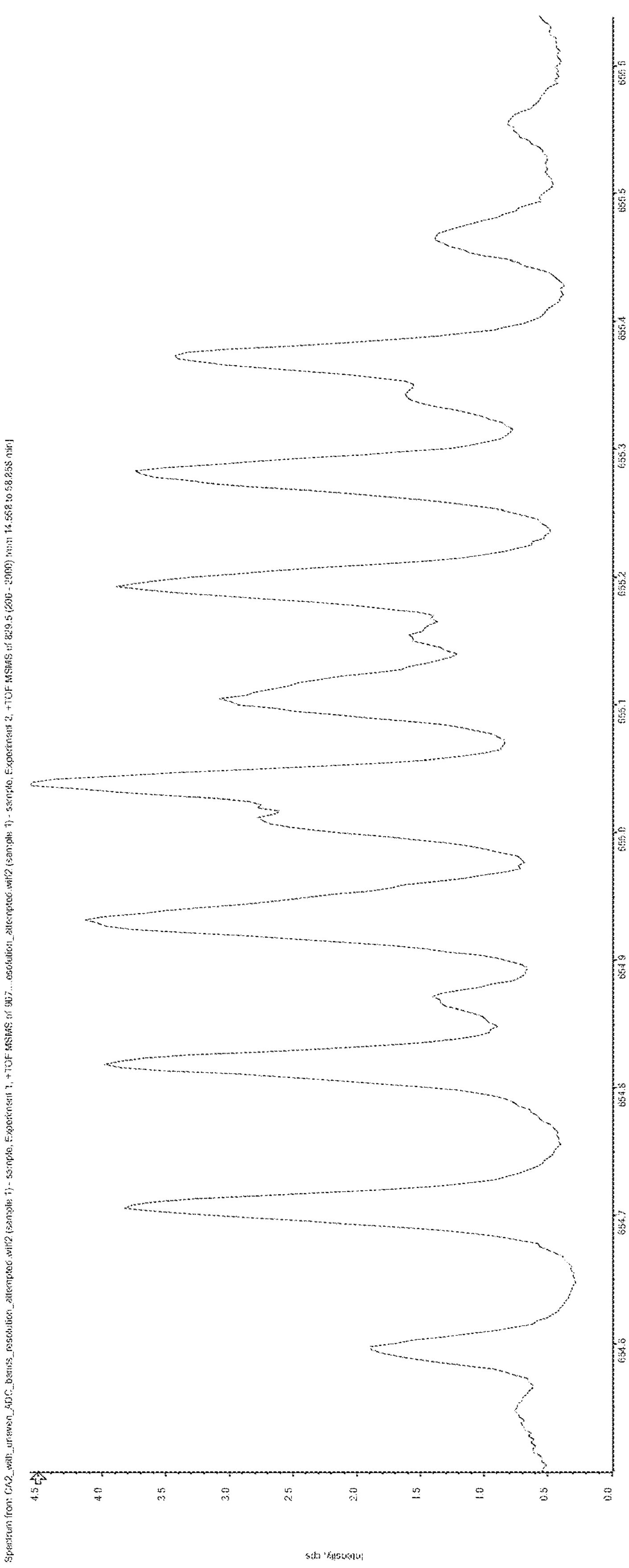
FIG. 1 is a plot illustrating an example of multiple overlapping features in an ECD top-down spectrum of CA2.
Figure 2:
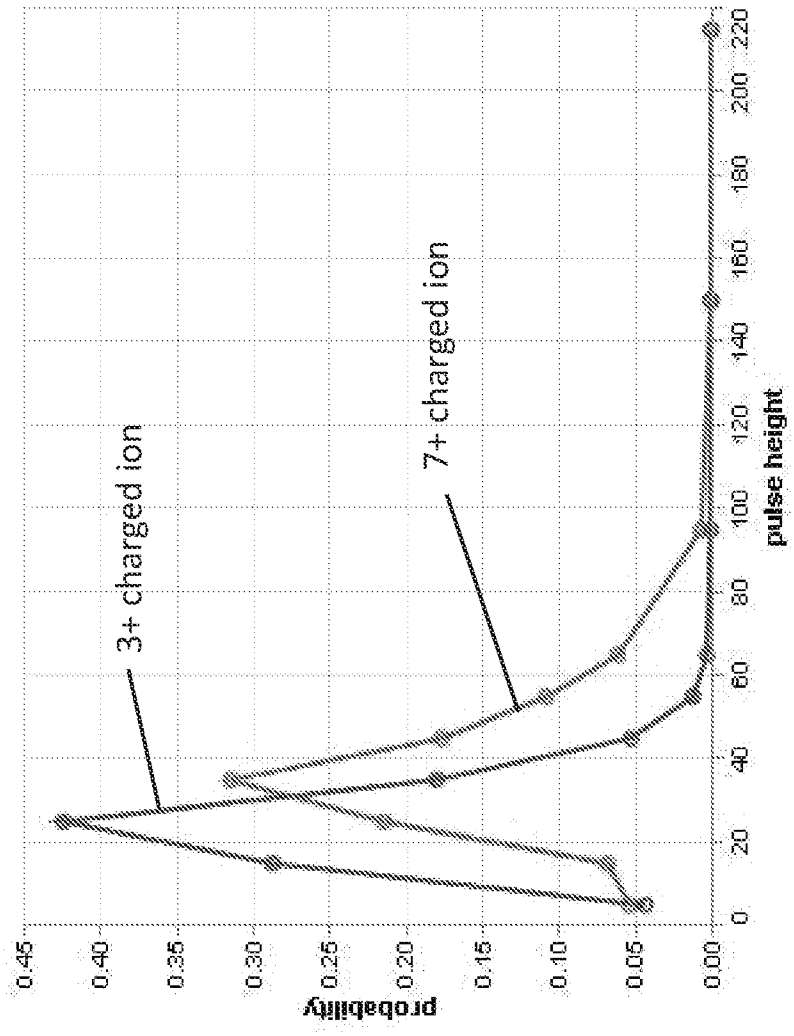
FIG. 2 is a plot illustrating an example of detector response distributions when detecting an ion with 3+ charge as compared to an ion with 7+ charge.
Figure 3:
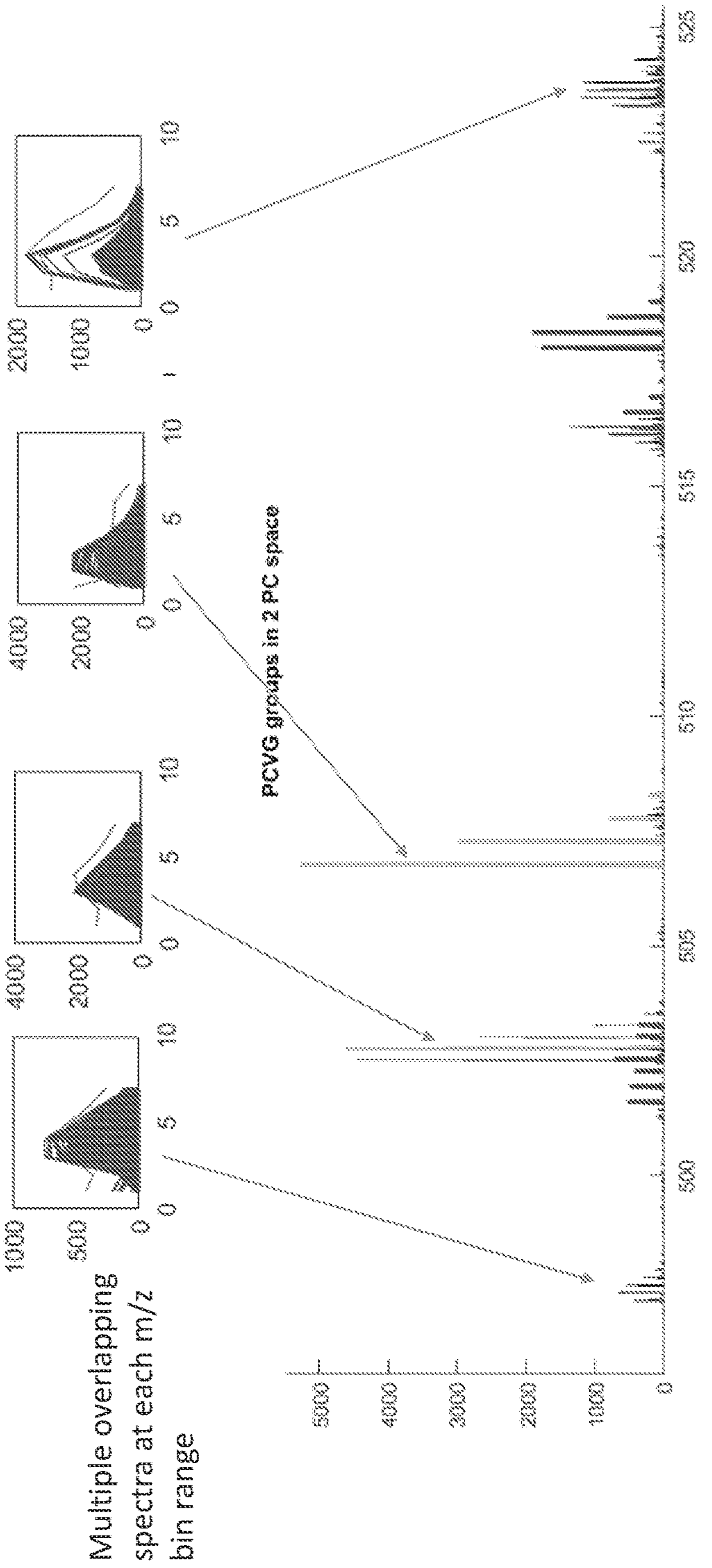
FIG. 3 is a plot illustrating an example of applying m/z bin ranges to a captured detector response profile.

FIG. 3 is a plot illustrating an example of a mass spectrum split into m/z "bins". Each m/z "bin" representing an m/z range and containing a portion of the mass spectrum which may be referred to as a detector response profile. Various m/z bins are then grouped based on the similarity of their detector response profiles forming substantially simplified spectra Theses spectra may be shown in separate colors (e.g. 'red', 'black', 'dark blue', 'light blue') for graphical representation purposes. The detector response profiles corresponding to m/z bins forming these simplified mass spectra are shown using arrows. In cases where the mass spectrometry system includes additional separation domains (e.g. retention time for LC separation, drift time, DMS operational parameters, such as compensation voltage and/or separation/dispersion voltage for the ion mobility domain, etc.), one or more of the separation domains may also be used, alone or in combination, to group the signal. In some aspects, a combination of separation domains may be utilized to group the signal into a plurality of specific subgroups.

The signal grouping may be performed by a variety of grouping algorithms such as, for example, principle component analysis (PCA), k-means clustering or other known grouping algorithms known in the art.

In some embodiments additional steps can be performed which may include, for instance, generating a library of detector response profiles and their associated charge states using well-characterized compounds. The library may be a generic library, applicable to a number of instruments or, alternatively, the library may be a custom library generated for a particular instrument. The library of detector response profiles and associated charge states for each of the well-characterized compounds providing reference templates that may be stored and then later accessed for comparison in subsequent analysis. For instance, in a subsequent analysis, a captured detector response profile may be compared to the stored detector response profiles in the library of detector response profiles to identify a corresponding stored detector response profile in order to identify an associated charge state for the captured detector response profile.

Optionally an m/z position of a compound may be stored in the library of detector response profiles and associated charge states in association with a compound of interest. In this embodiment, a step of charge state assignment is performed based on a degree of similarity between a captured detector response profile generated from captured mass analysis data captured for the compound of interest and a stored detector response profile in the library associated with that compound. The m/z position defining one or more m/z bins attributed to a corresponding one or more adjacent charge states for the compound. In a subsequent step the defined one or more m/z bins may then be co-extracted from the captured mass analysis data for subsequent analysis.

Often overlapping features have not only inter-digitated peaks, but also overlapping peaks, where a single m/z bin contains a signal that originated from multiple different species reaching the detector. In some cases, such a signal can be accurately attributed to those overlapping features. Indeed, if there are no co-detected events the total signal is a sum of the respective contributions originating from the different species and therefore can be decomposed into individual contributions using conventional linear algebra algorithms such as, for instance, non-negative least squares algorithm among other decomposition techniques. It is convenient to call a detector response profile originating from a single specie and recorded under a single ion arrival condition an elementary detector response profile. In some aspects, a plurality of detector response profiles may be captured. Each of the plurality of detector response profiles corresponding to its own elementary detector response profile, or an associated combination of elementary detector response profiles. In either case, each detection response profile corresponding to an overlapping peak can be decomposed into its elementary detector response profile(s).

In cases where the condition of single ion arrivals would not be satisfied for every ion, there would be arrival events where the m/z bins containing signal from the same type ions will have different detector response distributions depending upon a number of ions that arrived at that event.

Indeed, the signal is effectively summed on the detector and having multiple ions arriving simultaneously will lead to a rightward shift of the intensity of the detector response distributions.

Figure 4:
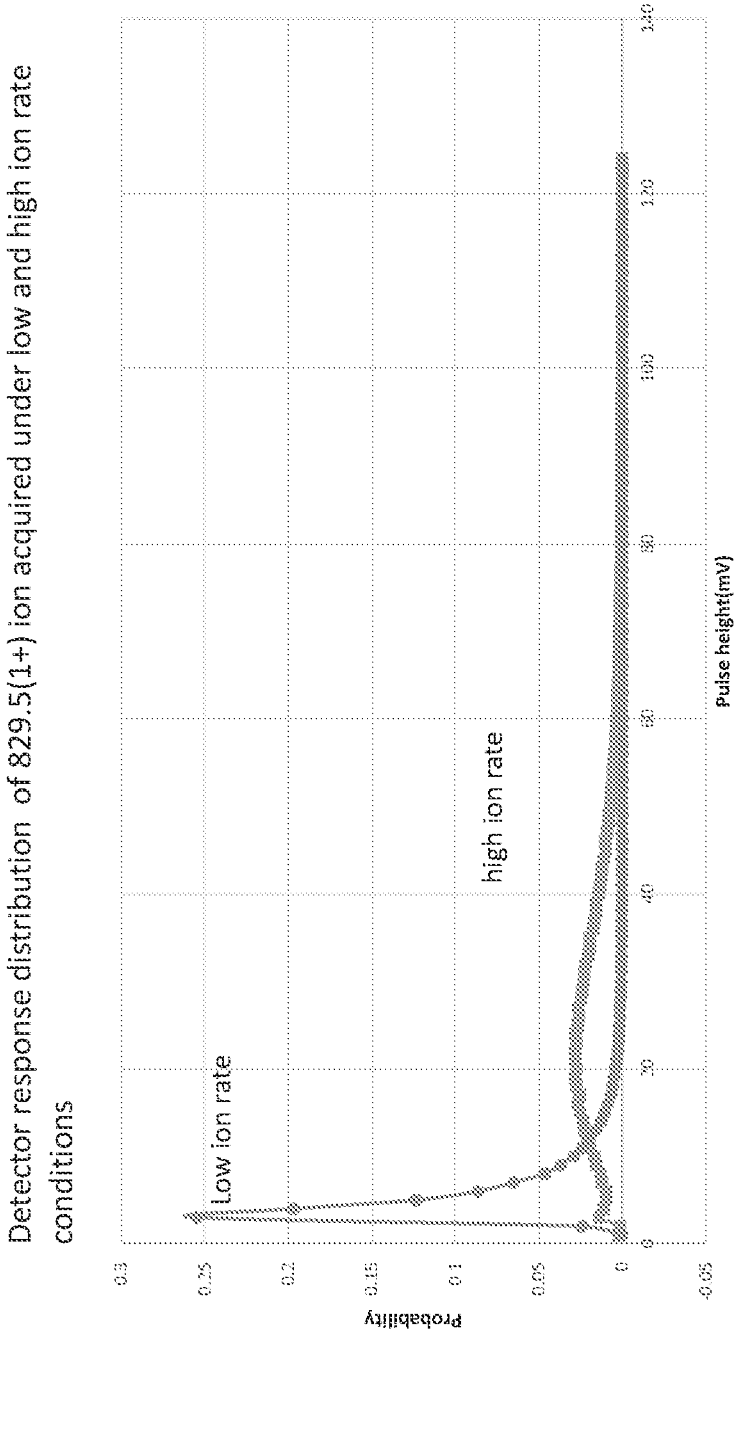
FIG. 4 is a plot indicating exemplar detector response distributions in response to a same ion type arriving at different rates relative to the acquisition cycle.

FIG. 4 is a plot indicating exemplar detector response profiles (i.e. distributions) in response to a same ion type arriving at different rates relative to the acquisition cycle. In the example of FIG. 4 the ion delivery rates correspond to an average number=0.2 ions per TOF push (predominantly single ion arrival for each acquisition cycle) and an average number=6 ions per push (predominantly multi-ion arrival for each acquisition cycle). As indicated, multi-ion arrival can prevent efficient grouping of such ions. In certain cases, it is hard to satisfy the condition of single ion arrival for every acquired type of ion. This is specifically a problem if there is a large discrepancy in total counts of different ion species. In this case, very long acquisition times will be required to acquire the data with enough statistics for low abundance ions, while satisfying the condition of a single ion arrival for high abundant ions. Therefore, it is desirable to have a strategy, which can tolerate a certain number of multiplicity for the ion arrivals.

Importantly, single ion arrivals and multiple ion arrivals can be distinguished by a simple examination of the frequency of observed detection events in the m/z bin. The process can be modeled, for instance using the Poisson distribution, and with simple calculation of 'no detection' occurrences for specific m/z bins, it is possible to calculate the frequencies of each ion multiplicity in the same bin. Such frequencies then can be used as an input to the grouping algorithms to help assign ions with different multiplicities to the same group of ions.

Cases of overlapping features at higher multiplicity may be resolved using a Bayesian framework, or other suitable technique.

Figure 5:
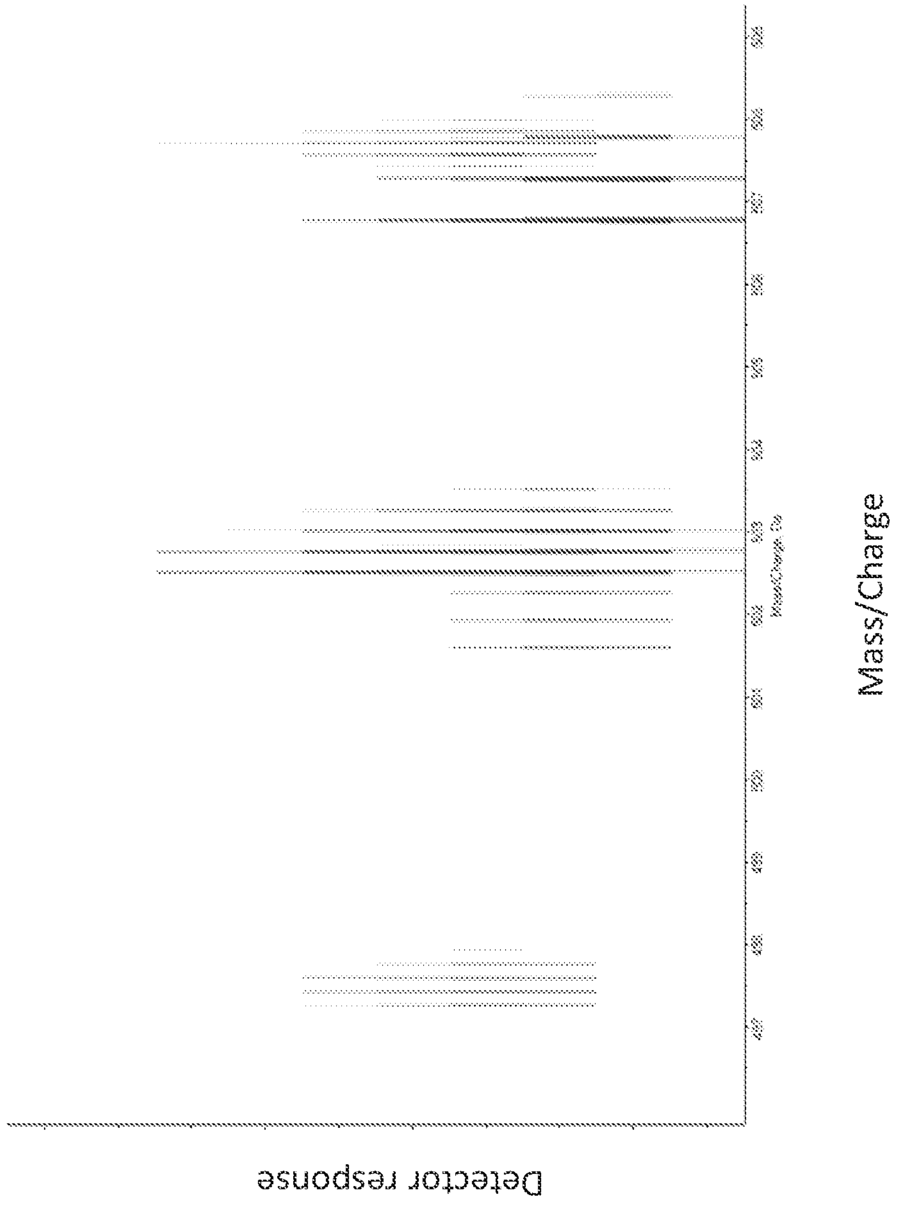
FIG. 5 is a representative heatmap with m/z and detector response dimensions for an exemplar ion collection event.

An alternative approach would be to use detector response profile and m/z position information in a single algorithm. FIG. 5 is a representative heatmap with m/z and detector response dimensions for an exemplar ion collection event. This data representation can be subjected to various pattern recognition algorithms and features than can be grouped. These pattern recognition algorithms can for example be machine-learning algorithms or image-recognition algorithms.

Based on the building blocks a number of different embodiments are possible, which combine an m/z and detector response domains and address charge state determination problem.

Figure 6:
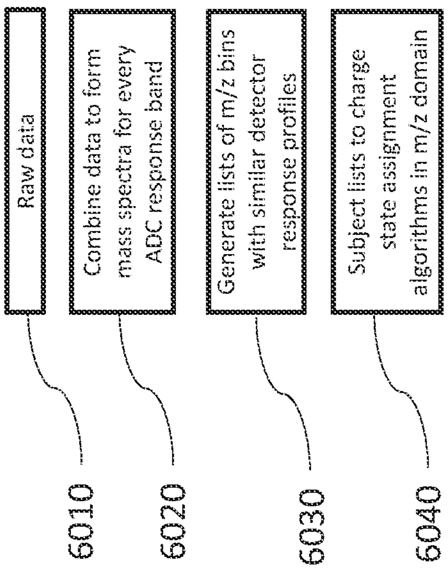
FIGS. 6 to 9 are embodiments of workflow diagrams for charge state assignment.

FIG. 6 is an embodiment of a workflow diagram for charge state assignment using detector response profiles. In the step 6010 of the embodiment of FIG. 6, data acquired in raw mode (retaining information about each detection event) and subsequently summed into multiple spectra using detector response bands (as described in PCT/IB2020/050795 and incorporated herein by reference) in step 6020. Steps 6010 and 6020 can be combined and performed during data acquisition. Following these steps, each m/z bin is grouped according to their detector response profiles (step 6030). This step can be performed using for example grouping algorithms, such as PCA or K-nearest neighbor algorithms. Following this step, a substantially simplified mass spectrum is formed and used as an input for m/z charge determination algorithms (step 6040). This step could be performed using charge deconvolution algorithms in m/z space and following described procedure the charge is assigned to a feature. Optionally the signal representing this feature can be converted to zero charge signal and co-added to form a mass spectrum as part of step 6040.

Figure 7:
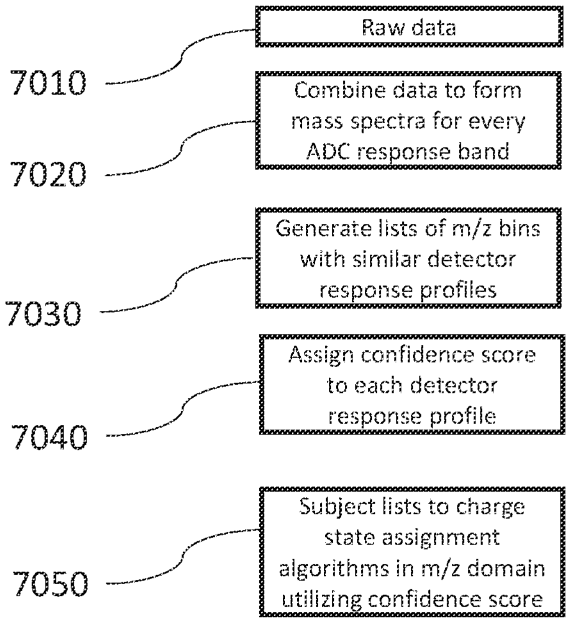

FIG. 7 is an embodiment of a workflow diagram for charge state assignment using detector response profiles. In the embodiment of FIG. 7, steps 7010-7030 are similar to the steps described in the previous embodiment, Step 7040 further performs a scoring of the grouping quality, which represents the quantitative degree of similarity of m/z bin towards a certain group or groups. The resulting grouping and scoring output than used as an input for charge state determination algorithms in m/z space, preferably based on a Bayesian framework, such as the UniDec algorithm (Marty et. al *Anal. Chem.* 2015, 87, 8, 4370-4376, incorporated herein by reference) for example, which can benefit from the additional confidence information (step 7050).

Figure 8:
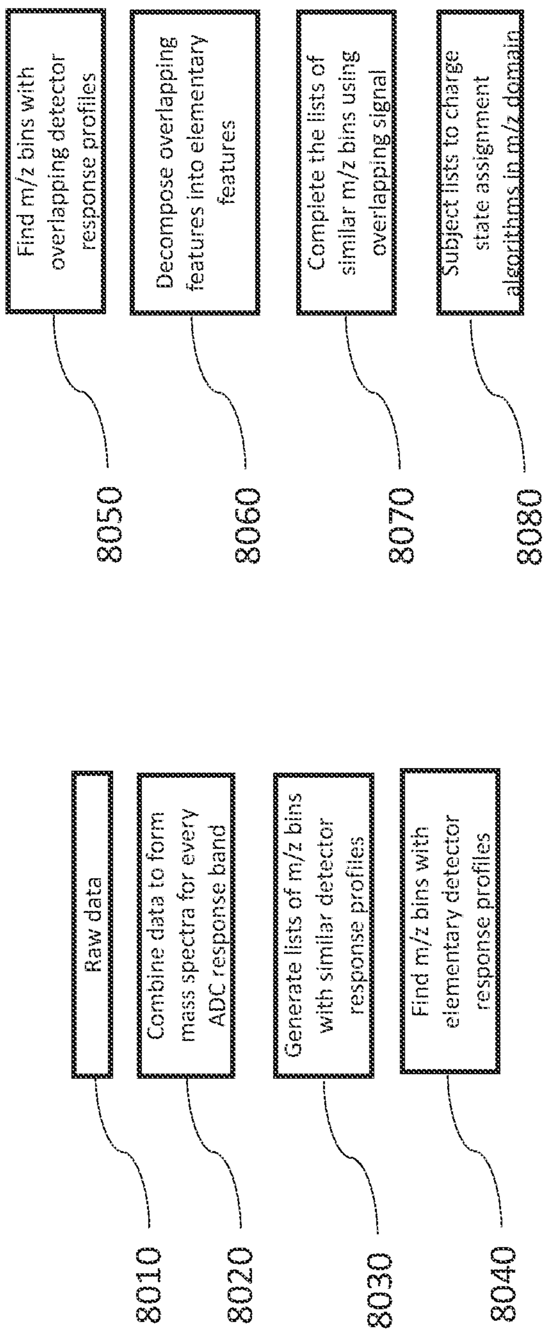
Figure 9:
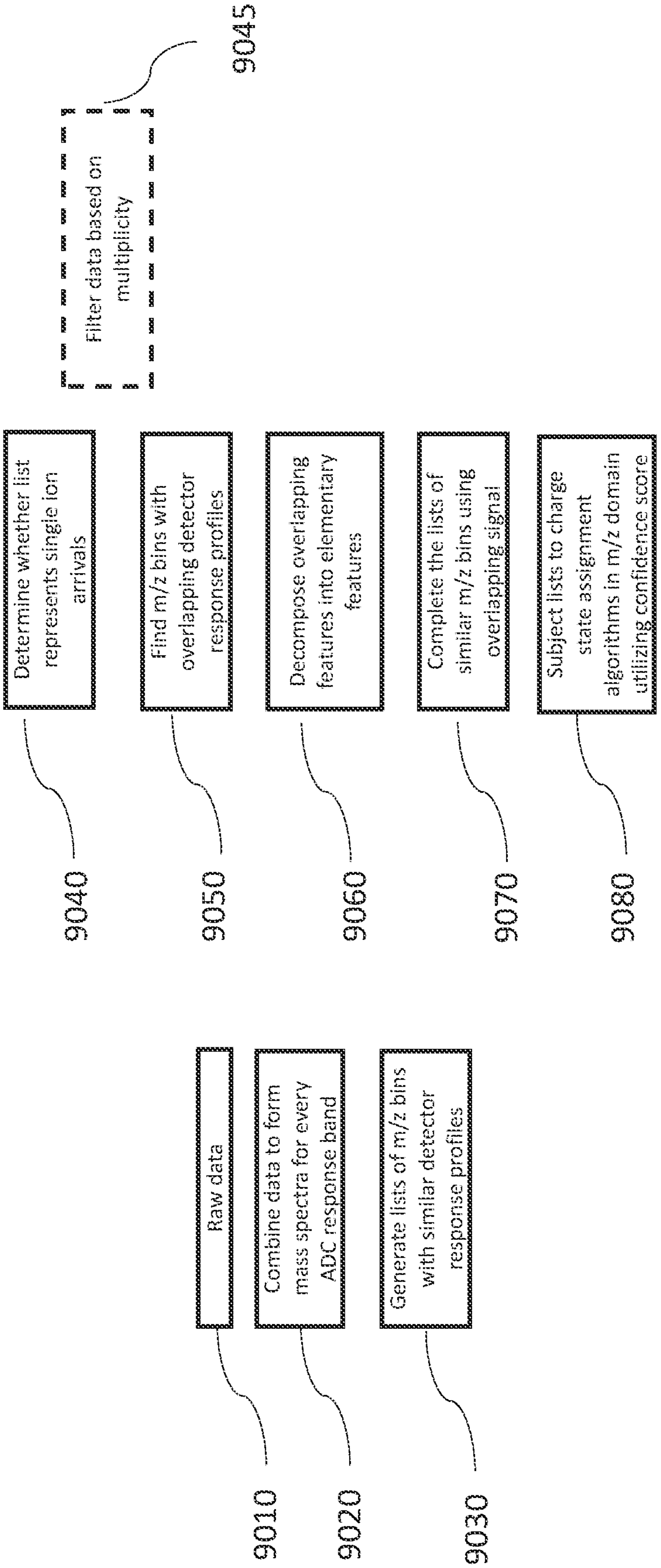

FIG. 8 is an embodiment of a workflow diagram for charge state assignment using detector response profiles. In the embodiment of FIG. 8, the steps 8010-8030 are similar to the embodiments of FIG. 6 and FIG. 7. Step 8040 involves identifying m/z bins with signal attributed to elementary detector response profiles. One exemplar method for this is to inspect m/z bins contained in each group for resembling a complete or partial isotope cluster with at least two isotopes being attributed. The corresponding detector responses from those m/z bins within said group may be attributed to the elementary detector responses. Step 8050 tentatively attributes all the other non-zero m/z bins not attributed in 8040 to the overlapping signal. In step 8060, each overlapping signal from 8050 is decomposed to elementary signals from 8040 using known algorithms, such as NNLS for instance. Optionally the charge state is tentatively identified for each group. This identification may, for example, be based on a relative distance of peaks forming an isotope cluster.

Figure 10:
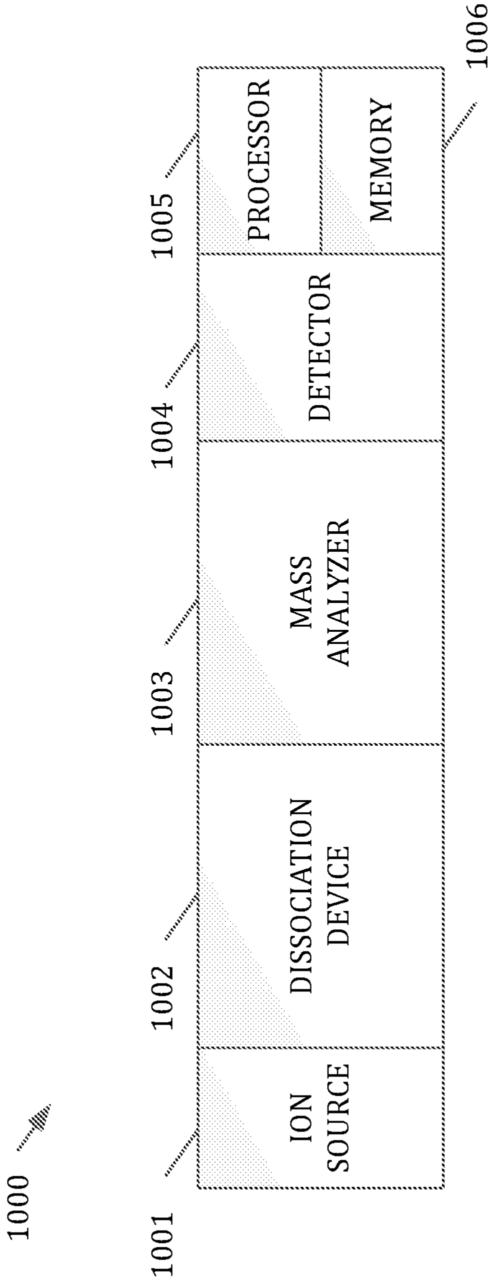
FIG. 10 depicts an example system for performing mass spectrometry.

The methods may be implemented employing a computing device including at least one processing element operable to execute program code stored in non-transitory memory. When executed, the program code rendering the computing device operable to execute any of the methods described above. The computing device may be communicatively coupled to a mass spectrometry system, or may be integral therewith. FIG. 10 depicts such an example system for performing mass spectrometry including the required processing elements and memory to perform the methods described herein. In some examples, the system 1000 may be a mass spectrometer. The example system 1000 includes an ion source device 1001, a dissociation device 1002, a mass analyzer 1003, a detector 1004, and computing elements, such as a processor 1005 and a memory 1006. The ion source device 1001 may be an electrospray ion source (ESI) device, for example. The ion source device 1001 is shown as part of a mass spectrometer or may be a separate device. The dissociation device 1002 may be an Electron-based dissociation (ExD) device or collision-induced dissociation (CID) device, for example. Electron-based dissociation (ExD), ultraviolet photodissociation (UVPD), infrared photodissociation (IRMPD) and collision-induced dissociation (CID) are often used as fragmentation techniques for tandem mass spectrometry (MS/MS). ExD can include, but is not limited to, electron capture dissociation (ECD) or electron transfer dissociation (ETD). CID is the most conventional technique for dissociation in tandem mass spectrometers. As described above, in top-down and middle-down proteomics, an intact or digested protein is ionized and subjected to tandem mass spectrometry. ECD, for example, is a dissociation technique that dissociates peptide and protein backbones preferentially. As a result, this technique is an ideal tool to analyze peptide or protein sequences using a top-down and middle-down proteomics approach.

The mass analyzer 1003 can be any type of mass analyzer used for a desired technique, such as a time-of-flight (TOF), an ion trap, or a quadrupole mass analyzer. The detector 1004 may be an appropriate detector for detection ions and generating the signals discussed herein. For example, the detector 1004 may include an electron multiplier detector that may include analog-to-digital conversion (ADC) circuitry. The detector 1004 may produce detection pulses for detected ions. The detector 1004 may also be an image charge induced detector.

The computing elements of the system 1000, such as the processor 1005 and memory 1006, may be included in the mass spectrometer itself, located adjacent to the mass spectrometer, or be located remotely from the mass spectrometer. In general, the computing elements of the system may be in electronic communication with the detector 1004 such that the computing elements are able to receive the signals generated from the detector 1004. The processor 1005 may include multiple processors and may include any type of suitable processing components for processing the signals and generating the results discussed herein. Depending on the exact configuration, memory 1006 (storing, among other things, mass analysis programs and instructions to perform the operations disclosed herein) can be volatile (such as RAM), non-volatile (such as ROM, flash memory, etc.), or some combination of the two. Other computing elements may also be included in the system 1000. For instance, the system 1000 may include storage devices (removable and/or non-removable) including, but not limited to, solid-state devices, magnetic or optical disks, or tape. The system 1000 may also have input device(s) such as touch screens, keyboard, mouse, pen, voice input, etc., and/or output device(s) such as a display, speakers, printer, etc. One or more communication connections, such as local-area network (LAN), wide-area network (WAN), point-to-point, Bluetooth, RF, etc., may also be incorporated into the system 1000.

We claim:

1. A method is for assigning charge states, the method comprising:
- capturing a detector's raw response signal corresponding to a plurality of ion arrival events, the detector's raw response signal comprising information related to individual ion responses generated by the detector for each ion arrival event; and
- converting the detector's raw response signal into a mass spectrum output by:
  - processing the detector's raw response signal to produce an intensity peak at an m/z value for each of the plurality of ion arrival events;
  - combining the detector's raw response signal with one or more additional data features corresponding to the ion arrival event to assign a charge state for that ion arrival event by associating each intensity peak with an m/z bin defined at least in part by the one or more additional data features, wherein the m/z bin is associated with the charge state, wherein the one or more additional features are selected from a group including: m/z domain information; ion mobility; DMS parameter; and chromatographic time; and
  - depicting the plurality of ion arrival events using the intensity peak at the m/z value and the charge state.

2. The method of claim 1, further comprising: calculating a mass corresponding to the ion arrival events based on the assigned charge states and the m/z corresponding to those ion arrival events.

3. A device for assigning charge states, the device comprising:
- at least one processing element;
- non-transitory memory storing program code that, when executed by the at least one processing element, causes the device to:
  - capture a detector's raw response signal corresponding to a plurality of ion arrival events, the detector's raw response signal comprising information related to individual ion responses generated by the detector for each ion arrival event; and
  - convert the detector's raw response signal into a mass spectrum output by:
    - processing the detector's raw response signal to produce an intensity peak at an m/z value for each of the plurality of ion arrival events;
    - combining the detector's raw response signal with one or more additional features corresponding to the ion arrival event to assign a charge state for that ion arrival event by associating each intensity peak with an m/z bin defined at least in part by the one or more additional data features, wherein the m/z bin is associated with the charge state, wherein the one or more additional features are selected from a group including: m/z domain information; ion mobility; DMS parameter; and chromatographic time; and
    - depicting the plurality of ion arrival events using the intensity peak at the m/z value and the charge state.

4. The device of claim 3, further operative to: calculate a mass corresponding to the ion arrival events based on the assigned charge states and the m/z corresponding to those ion arrival events.

5. A device for assigning charge states, the device comprising:
- at least one processing element;
- non-transitory memory storing program code that, when executed by the at least one processing element, causes the device to:
  - generate, from mass analysis data, a plurality of detector response profiles, each detector response profile comprising an m/z range containing a portion of a mass spectrum extracted from the mass analysis data;
  - evaluate the plurality of detector response profiles using a pattern recognition algorithm to group similar detector response profiles;
  - reduce each group of similar detector response profiles to a simplified mass spectrum representative of that group; and
  - associate each simplified mass spectrum with a corresponding compound and related charge state.

6. The device of claim 5, further operative to associate one or more additional separation domains with the detector response profiles.

7. The device of claim 6, wherein the additional separation domains are selected from the group including: retention time, drift time, and DMS operational parameters.

8. The device of claim 5, wherein the pattern recognition algorithm is one of principal component analysis (PCA) and k-means clustering.

9. A device for assigning charge states, the device comprising:

at least one processing element;

non-transitory memory storing program code that, when executed by the at least one processing element, causes the device to:

generate, from mass analysis data, a plurality of detector response profiles, each detector response profile comprising an m/z range containing a portion of a mass spectrum extracted from the mass analysis data; and, compare the detector response profiles with a previously generated library of detector response profiles to identify at least one of an associated compound and related charge state.

10. The device of claim 9, wherein the previously generated library of detector response profiles comprises a plurality of simplified mass spectra.

* * * * *